Patented Jan. 18, 1938

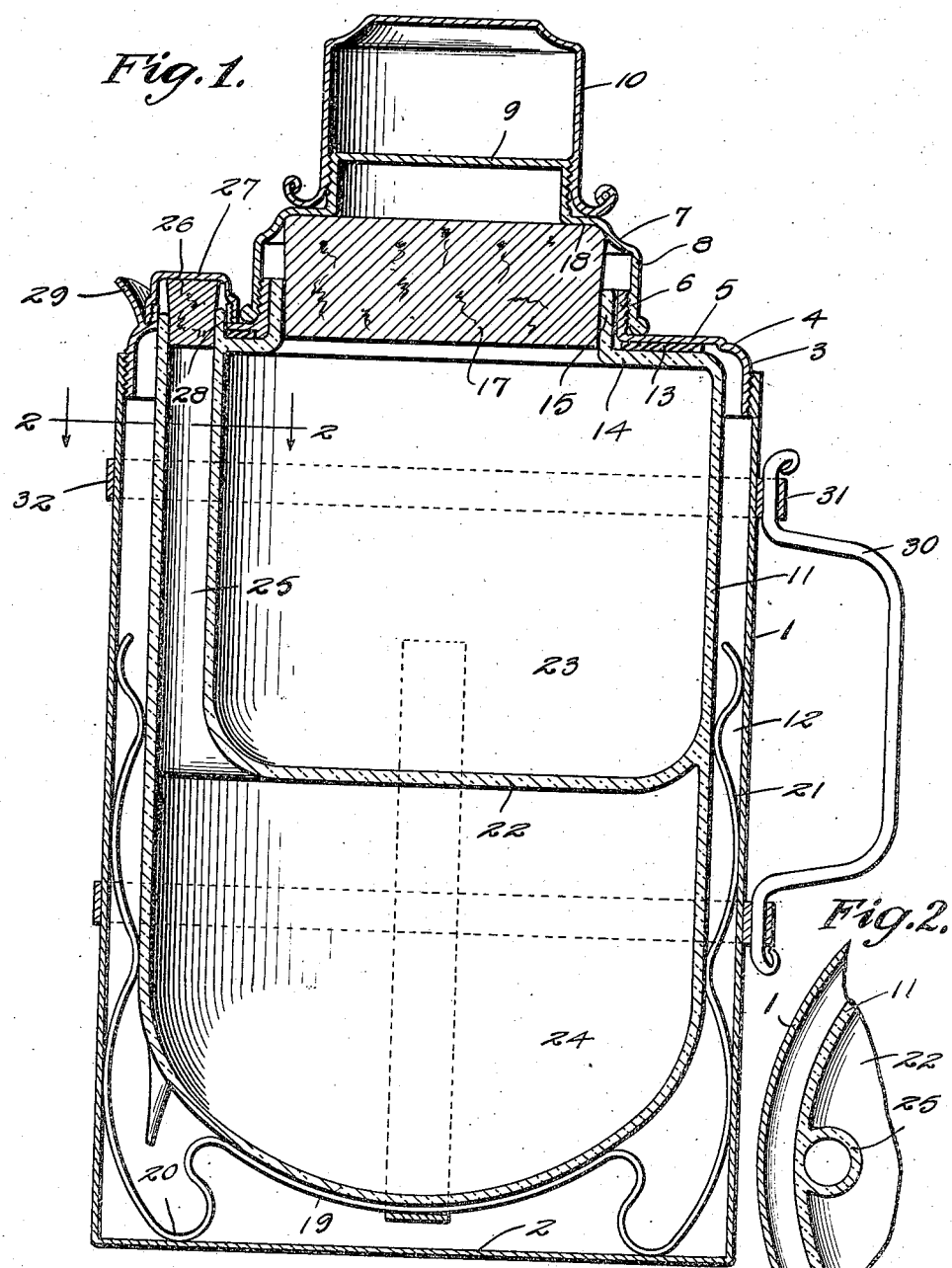

2,106,122

UNITED STATES PATENT OFFICE 2,106,122

CONTAINER

Frank D. McGowan, Worcester, Mass.

Application November 23, 1936, Serial No. 112,395

2 Claims. (Cl. 215—12)

This invention relates to containers, of the insulated or vacuum type, and its general object is to provide a container that keeps or retains its contents at a uniform temperature, for a substantial period of time, and which includes at least two compartments, one being primarily designed for solid or partial solid foods and the like and the other for liquids, and ready access may be had to the food compartment while liquid can be readily applied and removed or poured from the other compartment.

A further object is to provide a container of the character set forth, that is simple in construction, inexpensive to manufacture, will stand much abuse without damage or breakage, can be easily carried, and is extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a vertical sectional view taken through the container which forms the subject matter of the present invention and illustrates parts in elevation.

Figure 2 is a sectional view taken approximately on line 2—2 of Figure 1, looking in the direction of the arrows.

Referring to the drawing in detail, the reference numeral 1 indicates a casing having a flat bottom 2 and an open top or upper end which is interiorly threaded for the purpose of threadedly receiving the downturned annular flange 3 of a ring member 4, the latter including a flat portion 5 and an upturned annular flange 6.

A cap 7 is provided for the casing 1 and includes a lower portion 8 threadedly secured to the upturned annular flange 6, while the upper portion which is indicated by the reference numeral 9 has threadedly mounted thereon a cup 10, it being obvious that the cup is to be used for drinking purposes.

Disposed within the casing 1 is a vessel 11 which may be formed from coated or treated glass or other material suitable for a container of this character. In any event, the vessel is spaced from the casing 1 to provide a dead air space 12 which is retained accordingly by a gasket 13 disposed between the flat portion 5 of the ring member 4 and a shoulder 14 at the upper end of the vessel. Formed with the upper shouldered portion of the vessel 11, is a neck 15 which has frictionally fitting therewith a stopper 17, preferably of cork or the like, and the stopper is held within the neck by a shouldered portion 18 of the cap 7.

The vessel is supported within the casing through the instrumentality of a spring frame which urges the same upwardly for disposing the gasket 13 in tight association between the vessel and the ring member 4 and such not only retains the dead air space as above set forth, but likewise holds the vessel rigid, thereby preventing breakage or damage thereto. The spring frame is preferably formed from strips of resilient material secured together in crossed association and shaped to provide a rounded base 19 that follows the curvature of the rounded bottom of the vessel 11, as clearly shown in Figure 1, and from the base the strips are bent to provide feet 20 that rest upon the bottom 2 of the casing. The strips extend upwardly from the feet to provide corrugated spring arms 21 bearing alternately against the vessel and the wall of the casing.

An important feature of my container lies in the fact that it includes two separate and distinct compartments, and for that purpose, the vessel 11 is provided with a partition 22 which divides the vessel into an upper compartment 23 and a lower compartment 24, the upper compartment having the neck 15 opening therein, and is for the purpose of receiving solid or partial solid foods and the like, the neck being relatively large that ready access may be had to the compartment 23 in applying and removing food with respect thereto.

The lower compartment is solely for the purpose of receiving and dispensing liquids therefrom, and while the partition 22 provides the upper wall for the lower compartment, and the bottom for the upper compartment a vertical tube 25 is formed with the partition and the wall of the vessel for communication with the lower compartment, whereby liquid can be applied therein and removed therefrom. The tube is laterally disposed with respect to the upper compartment and terminates at its upper end above the shoulder of the vessel, to receive a stopper 26 for closing the same, the stopper being held within the tube through the instrumentality of a cap 27 which is threaded to a collar 28 formed on and rising from the ring member 4. The ring member has likewise formed thereon a pouring spout 29 for the tube.

While my container may or may not be provided with a handle to facilitate carrying the same, in the form as shown I have illustrated a handle 30 that is mounted for rocking movement in loops 31 that are secured to bands 32, the latter surrounding the casing and fixed thereto in any well known manner. By that construction, it will be obvious that the container can be readily carried and the handle will in no way interfere with applying and removing the caps and stoppers, and will facilitate the pouring of the contents of the lower compartment therefrom, as will be apparent upon inspection of Figure 1.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A container comprising a casing, a vessel within the casing, a partition dividing the vessel into separate upper and lower compartments, a neck at the upper end of the vessel and opening into the upper compartment, a stopper received by the neck for closing the upper compartment, tubular means rising from and communicating with the lower compartment, a stopper for closing the tubular means, a ring member threadedly secured to the upper end of the casing, caps engageable with the stoppers and threaded to the ring member, a pouring spout for the tubular means and formed on and rising at an outward inclination from the ring member, a flat portion included in the ring member, a shoulder at the upper end of the vessel, cushion supporting means for the vessel and including corrugated upright spring arms between the vessel and casing and engageable therewith, a gasket between the shoulder and flat portion and said cushion supporting means cooperating with the gasket to provide a dead air space between the vessel and casing.

2. A container comprising a casing, a vessel within the casing, a partition dividing the vessel into upper and lower separate compartments, closure means for the upper compartment and including a cap, vertical tubular means rising from the lower compartment and communicating therewith to provide access means therefor, closure means for the upper end of the tubular means, a pouring spout for the tubular means, cushion supporting means for the vessel, means cooperating with the supporting means to provide a dead air space between the vessel and casing, and a handle for the container and secured to the side thereof.

FRANK D. McGOWAN.